(No Model.)
C. W. SMITH.
PRICE SCALE.
No. 529,206.  Patented Nov. 13, 1894.
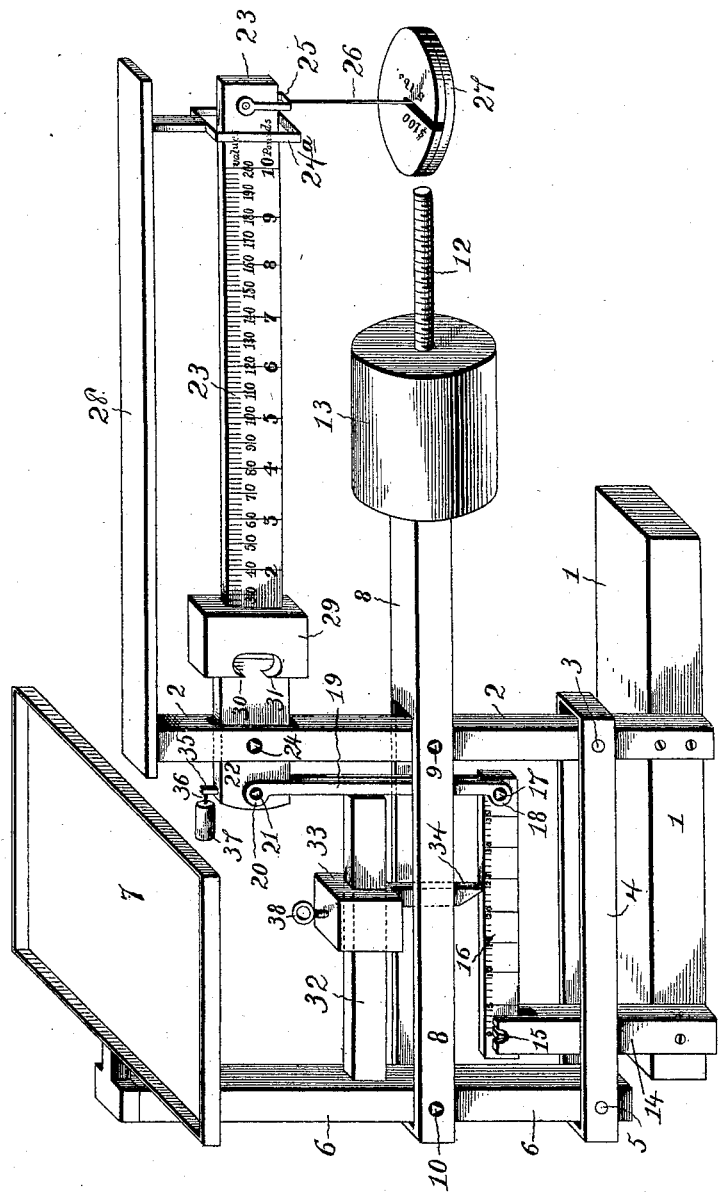
Witnesses:
Jas. E. Hutchinson.
G. W. Rea.
Inventor.
Chas. W. Smith,
By James L. Norris.
Attorney.

UNITED STATES PATENT OFFICE.

CHARLES W. SMITH, OF PELZER, SOUTH CAROLINA.

PRICE-SCALE.

SPECIFICATION forming part of Letters Patent No. 529,206, dated November 13, 1894.

Application filed August 2, 1894. Serial No. 519,286. (No model.)

*To all whom it may concern:*

Be it known that I, CHARLES W. SMITH, a citizen of the United States, residing at Pelzer, in the county of Anderson and State of South Carolina, have invented new and useful Improvements in Price-Scales, of which the following is a specification.

This invention has for its object to provide a new and improved weighing scale, which is simple in construction, efficient in operation, and enables the requisite amount of material to be given to a purchaser for a specified sum of money, without calculation to determine the number of pounds or ounces, which should be given for a certain sum of money.

To accomplish this object, my invention consists in the features of construction, and the combination of parts hereinafter described and claimed.

The weighing scale involves a pivoted scale-beam graduated to indicate money values and pounds, and coupled or linked by its short arm to one end of a price-beam, which is pivoted at its opposite end to a fixed standard or support. A scale pan or platform, or other device for sustaining the articles or materials to be weighed, is connected to a vertically movable support balanced by a yoke or frame and a vibratory lever having an adjustable balance weight. To the vertically movable support is connected a slide-support carrying an adjustable slide, having a pointer adapted to lie in juxtaposition to the price-beam for indicating the price per pound or fraction of a pound of goods or materials. The machine can be used simply for weighing articles or goods like any ordinary scale, but is particularly designed to avoid mental calculation, where persons ask for a specified value of some article in contradistinction to asking for a definite weight of the thing desired.

The invention is illustrated by the accompanying drawing, in which the figure is a perspective view of a weighing scale embodying my invention.

In order to enable those skilled in the art to make and use my invention, I will now describe the same in detail, referring to the drawing, wherein—

The numeral 1 indicates the stationary frame work or supporting base, which may be of any construction suitable for the conditions required, but which, as here shown, is composed of a horizontal timber 1, to which the lower end of a perpendicular support or standard 2 is rigidly secured by bolts, screws, or otherwise. To the stationary support or standard is pivoted, as at 3, one end of a vibratory yoke, or frame 4, having its other end pivoted, as at 5, to the lower end of a vertically movable support 6, preferably composed of a bar or timber with which a scale-pan or platform 7 is connected. In the present example the scale-pan or platform, or other device to sustain the articles or materials to be weighed, is secured to the upper end of the support 6, but it may be connected therewith at some other point suitable for the purpose in hand.

The yoke or frame 4, support 6, and scale-pan or platform 7, are balanced by a lever 8, which is hung by a knife-edge bearing 9, from the stationary standard 2. The lever is preferably slotted or bifurcated to embrace the standard, and also the bar or timber 6, and is pivoted at one end to the latter by a knife-edge bearing 10. The opposite end of the lever is provided with a screw threaded stem 12, on which is adjustably mounted a balance weight, or counterpoise 13, for balancing the yoke or frame 4, support 6 and scale-pan or platform 7.

The base frame 1, is provided with a rigidly attached vertical stud or arm 14, having at its upper edge a recess in which is supported a knife-edge bearing 15, on one end of a price-beam 16, the opposite end of which is provided with a knife-edge bearing 17, engaging an eye 18, in the lower end of a coupling or link 19. The upper end of this coupling or link contains an eye 20, with which is engaged a knife-edge bearing 21, on the short arm 22, of a scale beam 23, which is hung by a knife-edge bearing 24, from the stationary support or standard 2. The scale-beam is graduated in cent graduations to indicate values from zero to two dollars ($2), more or less, and is also graduated to indicate pounds from zero to ten pounds (10 lbs) more or less, to suit all the conditions required. The scale-beam is guided at its outer end in a guide loop or yoke 24ª, and is provided with a pivoted bail 25, having an attached rod 26, to the lower end of which a weight-carrier 27 is secured.

The guide loop or yoke is secured to a bar or beam 28 rigidly attached to the upper end of the stationary support or standard and lying horizontally above the scale-beam. The scale-beam is provided with a sliding weight 29, constructed with two edges or pointers 30 and 31, to co-operate respectively with the value and pound graduations of the scale-beam.

The vertically movable support 6, composed of a bar or timber, as before described, is provided with a rigidly attached slide-support 32, which lies horizontally above and parallel with the price-beam 16, and carries a slide 33, having a pendent price-pointer 34. The lower end portion of the price-pointer is beveled and its sharp extremity nearly touches the upper edge of the price-beam, which latter is graduated from zero to forty cents (40 cents), more or less, as occasion may demand.

The scale and price beams are balanced entirely independent of the yoke or frame 4, support 6 and scale-pan or platform 7, and the support 6, lies constantly in a plane parallel with the stationary support or standard. The short arm 22, of the scale-beam 23, is provided at the upper edge with a lug 35, having a horizontal screw-rod 36, on which is adjustably arranged a secondary counterpoise or counter balance weight 37, for placing the scale-beam in equilibrium.

The price slide 33, nicely fits the slide support 32, so as to smoothly slide in either direction and it is adapted to be rigidly secured to the slide support by a thumb-screw 38.

The adjustable counterpoise 37 serves to balance the scale-beam 23 and its connections, so that the upper edge of the price beam 16, will not press against the lower extremity of the pointer 34, but will stand barely touching the same when the weight is removed from the weight carrier 27.

When the several movable parts are perfectly balanced, the extremity of the pointer and the upper edge of the price-beam barely touch and, therefore, if one pound be placed on the scale-pan or platform it will cause the pointer of the price slide to press exactly one pound against the upper edge of the price beam 16.

If the knife edge bearings or pivots 21 and 24 are one inch apart, the weight 29 is exactly one-half pound and the extremity of the pointer 34 is at the graduation 20, which indicates 20c. per pound, and which graduation is precisely at the center of the price beam, and if one pound be placed on the scale pan or platform 7, one-half of the pound will be supported by the knife-edge bearing 15 and the other half by the knife-edge bearing 17, and the weight 29 must be moved one inch from the zero point of the indications on the scale beam 23 in order to balance the half pound weight exerted on the knife-edge bearing 17. In the example illustrated, and with the proportions as above specified, the 20c. indication would require the weight 29 to be moved one inch from the zero point on the scale beam, whereas the 40c. indication would require the weight 29 to be moved two inches from the zero point, and so on when weighing one, two and three pounds, with the extremity of the pointer 34 at the graduation 20 of the price beam.

As above described, it is easy to indicate values on the scale beam to suit twenty cents per pound, and therefore, if the different prices per pound are indicated on the price beam to suit the values indicated on the scale beam, the price scale is correct. 1c. per pound should be indicated at a point on the price beam where the pointer 34 would rest with twenty pounds on the scale pan or platform, which would exert the same influence on the knife-edge bearing 17 that one pound exerted when the pointer 34 was adjusted to the graduation 20c. on the price-beam, which point is one twentieth of the distance from zero to where the 20c. graduation per pound is indicated on the price-beam.

The 10c. per pound graduation is shown where the pointer 34 would rest with two pounds supported on the scale-pan or platform, thereby exerting the same influence on the knife edge bearing 17 that one pound exerted when the pointer 34 was at 20c. per pound on the price-beam, and that point is one-half way between zero and the 20c. graduation on the price-beam.

It is believed that the foregoing examples are sufficient to illustrate the perfect accuracy and simplicity of the principles upon which the price scale is based.

By placing a weight, as indicated in the drawing, on the weight-carrier 27, an amount greater than is indicated on the scale beam may be weighed at any time. The drawing indicates a weight representing one dollar. In a practical machine, the weight on the weight carrier, to be just sufficient to represent one dollar, would depend upon the weight of the sliding weight 29 taken in connection with the distance between the knife-edge bearings 21 and 24.

The lower line of graduations on the scale beam 23 indicates pounds when the pointer 34 is at the graduation 20 on the price beam and a greater quantity may be weighed by placing a weight on the weight carrier 27, as shown in the drawing.

Having thus described my invention, what I claim is—

1. The combination in a weighing scale of a balanced support, provided with a slide carrier, a scale-pan or platform connected with said support, a price-slide, having a pointer, a scale beam, having a sliding weight, and a price beam arranged in operative relation to the pointer of the price slide, and having one end pivoted to a fixed support and the opposite end coupled to one extremity of the scale-beam, substantially as described.

2. The combination in a weighing scale, of a balanced lever, a vertically movable support pivoted to said lever, a slide carrier, secured to said support, and provided with a price-slide having a pointer, a scale-pan or platform connected with the movable support, a scale-beam having graduations indicating values and pounds, an adjustable weight mounted on the scale-beam, a price-beam pivotally supported at one end, and arranged in operative relation to the pointer of the price-slide, and a link or coupling connecting the other end of the price-beam with the inner end of the scale-beam, substantially as described.

3. The combination in a weighing scale, of a stationary standard, a yoke or frame pivoted thereto, a vertically movable bar pivoted to the yoke or frame, a balanced lever pivoted to the standard and to the movable bar, a slide carrier connected with said bar, a price-slide adjustable on the slide carrier, and having a pointer, a pivoted scale-beam having graduations indicating values and pounds, an adjustable weight mounted on the scale-beam, and a price-beam pivotally mounted at one end and having its opposite end linked or coupled to the inner end of the scale-beam, substantially as described.

4. The combination in a weighing scale, of a balanced vertically movable bar or support having a horizontally arranged slide carrier, a scale-pan or platform connected with said bar or support, a price-slide adjustable on the slide carrier, a price-beam arranged in operative relation to the price-slide, a balanced scale-beam, and a link connecting the scale-beam with the price-beam, substantially as described.

In testimony whereof I have hereunto set my hand and affixed my seal in presence of two subscribing witnesses.

CHARLES W. SMITH. [L. S.]

Witnesses:
J. W. WILLIAMS,
T. O. L. ABBETT.